United States Patent [19]

Schimmel et al.

[11] Patent Number: 4,640,824
[45] Date of Patent: Feb. 3, 1987

[54] PROCESS FOR MAKING ALKALI METAL PHOSPHATE SOLUTIONS CONTAINING LITTLE FLUORINE

[75] Inventors: Günther Schimmel; Reinhard Gradl, both of Erfstadt, Fed. Rep. of Germany

[73] Assignee: Hoechst Aktiengesellschaft, Frankfurt, Fed. Rep. of Germany

[21] Appl. No.: 682,053

[22] Filed: Dec. 14, 1984

[30] Foreign Application Priority Data

Dec. 29, 1983 [DE] Fed. Rep. of Germany ....... 3347421

[51] Int. Cl.$^4$ ............................................. C01B 25/16
[52] U.S. Cl. ..................................... 423/185; 423/313; 423/321 S
[58] Field of Search ............. 423/185, 312, 313, 321 S

[56] References Cited

U.S. PATENT DOCUMENTS 2,053,319 9/1936 Block et al. .......................... 423/185

*Primary Examiner*—John Doll
*Assistant Examiner*—Wayne A. Langel
*Attorney, Agent, or Firm*—Connolly and Hutz

[57] ABSTRACT

The disclosure relates to a process for making alkali metal phosphate solutions containing little fluorine from pre-purified alkali metal phosphate solutions obtained from crude phosphoric acid by extracting the acid with an organic solvent being immiscible or only partially miscible with water, scrubbing the crude extract with water or an alkali metal solution, re-extracting the phosphoric acid from the scrubbed extract with the use of an aqueous alkali metal solution while establishing an alkali metal/P-molar ratio equal to or larger than 1:1, and separating the resulting organic phase from the pre-purified alkali metal phosphate solution obtained.

To this end, the disclosure provides:

(a) for the pre-purified alkali metal phosphate solution to be stirred at 60°–120° C. into a compound of an alkaline earth metal $Me^{2+}$ with a solubility in water at 20° C. of more than 0.01 mol $Me^{2+}/l$, alkaline earth metal compounds with a solubility in water of less than 5 g/l being used in the form of particles of which more than 50% have a size of less than 8 $\mu m$, for the whole to be reacted over a period of 0.5 to 4 hours, and for the resulting precipitate to be separated from the alkali metal phosphate solution so purified, and (b) for the alkaline earth metal compound necessary for effecting the defluorination to be suspended or dissolved in the alkali metal phosphate solution needed for effecting the re-extraction, and for the reaction between the alkali metal phosphate solution and alkaline earth metal compound to be effected in the mixing zone of the re-extraction unit.

6 Claims, No Drawings

PROCESS FOR MAKING ALKALI METAL PHOSPHATE SOLUTIONS CONTAINING LITTLE FLUORINE

The present invention relates to a process for making alkali metal phosphate solutions containing little fluorine from pre-purified alkali metal phosphate solutions obtained from crude phosphoric acid by extracting the acid with an organic solvent being immiscible or only partially miscible with water, scrubbing the crude extract with water or an alkali metal solution, re-extracting the phosphoric acid from the scrubbed extract with the use of an aqueous alkali metal solution while establishing an alkali metal/P-molar ratio equal to or larger than 1:1, and separating the resulting organic phase from the pre-purified alkali metal phosphate solution obtained.

Wet-processed phosphoric acid is obtained on subjecting apatite minerals to treatment with a mineral acid and separating the resulting calcium compound. This is crude phosphoric acid which has the bulk of cationic contaminants originating from the ore dissolved in it and which contains fluoride originating from the apatite mineral, in the form of HF and/or $H_2SiF_6$. Various attempts have therefore been made to reduce the F-content in phosphoric acid or phosphate solutions, which substantially provide for the fluoride to be either expelled in gaseous form or for it to be precipitated as solid matter, from an acid solution. In the first case, the acid is customarily treated with steam and HF and/or $SiF_4$ are allowed to escape (cf. German Specification DE-OS 28 22 303). In the second case, the fluoride is precipitated in the acid medium, normally in the form of $Na_2SiF_6$, by the addition of either sodium or silicon ions or both, in stoichiometric proportions (cf. German Specification DE-PS 16 67 435). A disadvantage which is common to all of these processes resides in the fact that either considerable energy, i.e. steam, or an expensive stripping means is required to be used, while precipitation in an acid medium enables the F-content to be reduced insufficiently only, owing to the high solubility of the salt. In DE-PS 16 67 435, for example, which provides for $Na_2SiF_6$ to be precipitated, the residual concentration is still as high as 0.2% $F/P_2O_5$. As disclosed in U.S. Pat. No. 4,026,995, it is also possible for the fluorine present in phosphoric acid to be precipitated as $CaF_2$ by the addition of calcium phosphate, the residual concentration being in this case at best 0.3% $F/P_2O_5$.

The removal of fluoride ions from neutral phosphate solutions has also been tried. In German Specification DE-OS 26 35 893, for example, crude phosphoric acid is first extractively purified with the use of amyl alcohol; next, it is reextracted with water and an extensively decontaminated phosphoric acid is obtained which is further purified by precipitating it with the use of sodium hydroxide solution, the sodium phosphate solution so treated having a pH-value of 6.5 to 7 and containing about 20% $P_2O_5$ but not more than about 20 ppm $F^-$. This sodium phosphate solution is further treated using a large excess of solid hydroxyl apatite and/or tertiary calcium phosphate permitting the $F^-$-content to be further reduced to a few ppm F.

This process has two disadvantages associated with it which reside in the use of expensive synthetic hydroxyl apatite which incidentally has to be used in a considerable stoichiometric excess, ($Ca^{2+}$ is required to be used in a in a proportion which is 42 times the molar proportion of $F^-$ in order to reduce the F-content from initially 152.6 ppm to 17.3 ppm) and in the fact that the process is expensive and cumbersome. In addition to this, the extraction and re-extraction of phosphoric acid with water give rather impure phosphoric acid which is subsequently subjected to an additional purification by extraction with addition of sodium hydroxide solution. Only then is the sodium phosphate solution obtained after filtration actually subjected to defluorination.

An alkali metal phosphate solution sufficiently pure for a variety of uses is obtained by a process which is technically easier to carry out and which provides for the crude phosphoric acid to be worked up by multi-stage extraction into an alkali metal phosphate solution. Only fluoride is but insufficiently separated in this manner and the bulk of it goes into the purified alkali metal phosphate solution.

Depending on the use the alkali metal phosphate solution is put to, it is good practice to select the quantity of alkali metal used in the re-extraction stage so as to have an alkali metal/P-ratio of 1:1 to 2:1. In the event of the solution being worked up to pentasodium triphosphate, it is advantageous to have a Na/P-ratio of $5:3 \approx 1.667$ in the re-extraction stage.

It is therefore desirable to have a process permitting alkali metal phosphate solutions extracted from crude wet-processed phosphoric acid and containing alkali metal and phosphorus in varying molar proportions to be defluorinated in technically simple and inexpensive manner to establish a residual fluoride content low enough for the most various commercial uses.

To this end, the process of this invention unexpectedly provides (a) for the pre-purified alkali metal phosphate solution to be stirred at 60°–120° C. into a compound of an alkaline earth metal $Me^{2+}$ with a solubility in water at 20° C. of more than 0.01 mol $Me^{2+}/l$, alkaline earth metal compounds with a solubility in water of less than 5 g/l being used in the form of particles of which more than 50% have a size of less than 8 µm, for the whole to be reacted over a period of 0.5 to 4 hours, and for the resulting precipitate to be separated from the alkali metal phosphate solution so purified, and (b) for the alkaline earth metal compound necessary for effecting the defluorination to be suspended or dissolved in the alkali metal phosphate solution needed for effecting the re-extraction, and for the reaction between the alkali metal phosphate solution and alkaline earth metal compound to be effected in the mixing zone of the re-extraction unit.

The alkaline earth metal compounds of low solubility in water should preferably be selected from fine particulate alkaline earth metal oxides or hydroxides, especially CaO or $Ca(OH)_2$. They are used in the form of solid matter which is added to the alkali metal phosphate solution, whilst the alkaline earth metal compounds of high solubility in water, such as $Mg(NO_3)_2$ or $Ca(NO_3)_2$, for example, should preferably be added as an aqueous solution.

It is good practice to use the alkaline earth metal compound in 2 to 20 times the stoichiometric quantity, based on the formation of the corresponding alkaline earth metal fluoride. The precipitate obtained in stage (a) after reaction of the alkaline earth metal compound and separated from the purified alkali metal phosphate solution should preferably be washed out with warm water and recycled to the extraction stage for recovery of the $P_2O_5$ contained in it.

This should more preferably be done by suspending or dissolving the cake in the scrubbing raffinate to be recycled, the raffinate being the aqueous solution which is obtained on scrubbing the crude phosphoric acid extract.

The process of this invention offers a series of advantages and complies with two basic specifications, namely to ensure a good defluorination efficiency with the use of relatively little material, and combines this with a high filtration output during the separation of the neutral to alkaline filter cake containing fluoride.

On being stirred into a fluoride-containing sodium phosphate solution (molar ratio $PO_4/F \sim 100:1$), the alkaline earth metal compounds are not exclusively converted to calcium phosphate as would have been expected, but are even predominantly converted to alkaline earth metal fluoride. In the event of the cation being $Ca^{2+}$, for example, the defluorination efficiency is the better the finer the particle size of the compound and the higher its solubility. $Ca(OH)_2$, for example, produces better results than CaO of identical fineness of grinding. Coarse $Ca(OH)_2$ on the other hand is extremely less active than finer material.

Soluble salts, e.g. $Ca(NO_3)_2$ or $Mg(NO_3)_2$, if used as an aqueous solution, indeed have a slightly improved specific defluorination efficiency, but they compare unfavorably with the oxides or hydroxides, in respect of the following points:

(a) they introduce foreign anionic contaminants into the phosphate solution;
(b) they affect the filterability of the suspension;
(c) they effect the inclusion of more $P_2O_5$ in the filter cake;
(d) they are higher in price, based on an identical quantity of cations in the form of oxides or hydroxides.

Completely water-insoluble compounds, e.g. finely ground limestone, are inefficient.

As shown in the following Examples, it is the reaction temperature which is of vital importance (cf. Examples 3 and 4). The use of a reaction temperature lower than 60° C. inter alia results in an unsatisfactory defluorination efficiency and in the formation of an extremely ill-filterable and ill-washable filter cake.

In the event of the contact period selected being too short or too long, the degree of $F^-$-reduction is adversely affected in the first case by an incomplete reaction, and in the second case by the occurrence of redissolution phenomena. Any contamination of the phosphate salt solution by alkaline earth metal ions was not observed.

As can be inferred from the above statements, a very attractive method of carrying out the present invention provides for a most finely divided alkaline earth metal hydroxide to be used at temperatures of about 80° C.; $Mg^{2+}$ compares unfavorably with $Ca^{2+}$ in the occurrence of slight post-precipitation phenomena in the phosphate solution over days.

It has been found highly advantageous to dissolve or suspend the alkaline earth metal compound in the alkali metal solution used in the re-extraction stage, and to effect the defluorination in that stage; this result in a particularly good defluorination efficiency and avoids the need to use an additional separate recipient with agitator. It has also been found that the solid alkaline earth metal compound forming is completely retained in the aqueous alkali metal phosphate solution and prevented from contaminating the organic phase.

The technically beneficial effects of the process of this invention can be summarized as follows:

(1) High $F^-$-reduction with the use of relatively little alkaline earth metal chemicals
(2) Use of inexpensive earth metals
(3) Little expenditure of apparatus
(4) High space/time-yields due to very good filtration output
(5) No contamination of phosphate solution by cations The following Examples illustrate the invention which is naturally not limited thereto.

1 liter African crude acid (50.34% $P_2O_5$ and 0.21% F) was subjected to a multistage extraction using 6 l amyl alcohol admixed with sulfuric acid. The resulting organic phosphoric acid extract (crude extract) was scrubbed in 10 stages with water in a ratio by volume of 25:1. This gave a so-called pure extract which was treated with a corresponding quantity of sodium hydroxide solution of 50% strength in a single stage mixer-settler unit and thereby re-extracted to give sodium phosphate solution. The exact figures and conditions are indicated in the Table hereinafter.

EXAMPLES 1-5

The pure extracts were re-extracted using varying quantities of sodium hydroxide solution of 50% strength and three different sodium phosphate solutions were obtained. These were re-extracted using the alkaline earth metal compounds indicated in the Table, stirred for 2 hours while hot and then filtered off using a pressure filter covered with a polypropylene needle felt.

EXAMPLES 6-9

In modifying the procedure described in Examples 1, 2, 4 and 5, the overall quantity of alkaline earth metal compound was suspended and/or dissolved in the sodium hydroxide solution needed for re-extraction and introduced together with that solution into the re-extraction mixer-settler unit. All other conditions were the same as those used in Examples 1, 2, 4 and 5.

The sodium phosphate solutions running off in which all reacted alkaline earth metal compounds were suspended, were filtered off while hot using a pressure filter. The clear filtrates all contained less fluorine than the filtrates obtained in Examples 1, 2, 4 and 5; the same is true concerning the alcohol coming from the re-extraction stage.

| Ex. | Pure extract % $P_2O_5$ | Pure extract % F | NaOH (50%) (ml/h) | Crude sodium phosphate solution Na:P | Crude sodium phosphate solution % $P_2O_5$ | Crude sodium phosphate solution % F | Temperature (°C.) | Alkaline earth metal compound Type | Alkaline earth metal compound quantity (g) | Na—phosphate solution filtered off % F | Alcohol running off % $P_2O_5$ |
|---|---|---|---|---|---|---|---|---|---|---|---|
| 1 | 8.99 | 0.026 | 320 | 1:1 | 32.0 | 0.080 | 80 | $Ca(OH)_2$* | 18.3 | 0.024 | 0.2 |
| 2 | 8.99 | 0.024 | 470 | 1.33:1 | 29.4 | 0.072 | 80 | $Ca(OH)_2$ | 18.9 | 0.015 | 0.1 |
| 3 | 9.37 | 0.024 | 580 | 1.67:1 | 27.2 | 0.068 | 100 | $Ca(OH)_2$ | 19.4 | 0.0045 | 0.16 |
| 4 | 9.37 | 0.024 | 580 | 1.67:1 | 27.2 | 0.068 | 80 | $Ca(OH)_2$ | 19.4 | 0.0095 | 0.15 |

-continued

| | Pure extract | | NaOH (50%) | Crude sodium phosphate solution | | | Temperature | Alkaline earth metal compound | | Na—phosphate solution filtered off | Alcohol running off |
|---|---|---|---|---|---|---|---|---|---|---|---|
| Ex. | % P$_2$O$_5$ | % F | (ml/h) | Na:P | % P$_2$O$_5$ | % F | (°C.) | Type | quantity (g) | % F | % P$_2$O$_5$ |
| 5 | 9.37 | 0.024 | 580 | 1.67:1 | 27.2 | 0.068 | 80 | Ca(NO$_3$)$_2$.4H$_2$O | 59.2 | 0.003 | 0.14 |
| 6 | | | | | | | | | | 0.019 | 0.1 |
| 7 | | | | | | | | | | 0.010 | 0.07 |
| 8 | | | | | | | | | | 0.006 | 0.06 |
| 9 | | | | | | | | | | 0.0015 | 0.05 |

*81% of Ca(OH)$_2$ particles <8 μm

We claim:

1. In the process for making alkali metal phosphate solutions containing little fluorine from pre-purified phosphoric acid solutions obtained from crude phosphoric acid by extracting the acid with an organic solvent being immiscible or only partially miscible with water, scrubbing the crude extract with water or an alkali metal salt solution, re-extracting and neutralizing the phosphoric acid from the scrubbed extract and reducing the fluorine content of the acid by a treatment with an alkaline earth metal compound and separating the resulting organic phase from the purified alkali metal phosphate solution obtained, the improvement which comprises:
    (a) reextracting the phosphoric acid from the extract by reacting with an aqueous alkali solution in an amount for establishing in the reaction mixture an alkali metal/P-molar ration equal or greater than 1:1;
    (b) suspending or dissolving a defluorination agent consisting essentially of an alkaline earth metal compound in the said alkali solution of said step (a); allowing the reaction between the phosphoric acid extract and the alkaline earth metal compound containing alkali solution to take place in the mixing zone of the re-extraction unit at 60°–120° C.;
    (c) using as a compound of an alkaline earth metal Me$^{2+}$ such having a solubility in water at 20° C. of more than 0.01 mol Me$^{2+}$/l, whereby alkaline earth metal compounds having a solubility in water of less than 5 g/l being used in the form of particles of which more than 50% have a size of less than 8 μm, allowing the whole to react over a period of 0.5 to 4 hours, and separating the resulting precipitate from the alkali metal phosphate solution so purified.

2. The process as claimed in claim 1, wherein the alkaline earth metal compound of low solubility in water is a particulate alkaline earth metal oxide or hydroxide.

3. The process as claimed in claim 1, wherein the alkaline earth metal of high solubility in water is added in the form of an aqueous solution to the alkali metal phosphate solution.

4. The process as claimed in claim 1, wherein the alkaline earth metal compound is used in 2 to 20 times the stoichiometric quantity necessary for the formation of the corresponding alkaline earth metal fluoride.

5. The process as claimed in claim 1, wherein the precipitate separated in stage (c) is washed out with warm water.

6. The process as claimed in claim 1, wherein the precipitate separated in stage (c) is suspended or dissolved in the solution obtained on scrubbing the extract, and recycled together with that scrubbing solution to the extraction stage.

* * * * *